Patented Aug. 3, 1926.

1,594,805

UNITED STATES PATENT OFFICE.

HENRY WENKER, OF HAMBURG, NEW YORK, ASSIGNOR TO NATIONAL ANILINE & CHEMICAL CO., INC., OF NEW YORK, N. Y., A CORPORATION OF NEW YORK.

AZO DYES CONTAINING A DIPHENYLUREA NUCLEUS.

No Drawing.   Application filed November 6, 1925. Serial No. 67,432.

This invention relates to the manufacture and production of new azo dyes containing a diphenylurea nucleus which are of value for dyeing cotton. The fabric, or other material, dyed with a dyestuff of the present invention also constitutes a part of the invention.

The new dyestuff can be obtained by treating with phosgene in the presence of a substance adapted to absorb hydrochloric acid, a mixture of one or of two molecular proportions of a para-aminobenzene-azo-arylsulfonic or carboxylic acid which contains only one free amino group, and which corresponds with the general formula

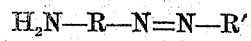

$$H_2N-R-N=N-R'$$

wherein R signifies an aryl nucleus of the benzene series which may contain substituents and R′ a sulfonated or carboxylated aryl nucleus of the benzene or naphthalene series which may contain substituents, with one molecular proportion of a disazo dyestuff which corresponds with the general formula

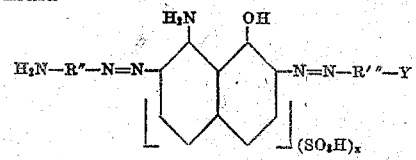

wherein R″ signifies an aryl nucleus of the benzene series which may contain substituents, R′″ an aryl nucleus of the benzene series, $x$ an integer having the value of 1 or 2, and Y a hydrogen atom or an amine or substituted amino group, or a substituent other than a nitro or a hydroxyl group, attached to the benzene nucleus. When Y is an amino group, two molecular proportions of the para-aminobenzene-azo-arylsulfonic or carboxylic acid are employed in the mixture comprising the reaction mass to be phosgenated otherwise only one molecular proportion of said acid is used.

The new dyestuffs, in the dried and pulverized state and in the form of their alkali metal salts, constitute dark powders soluble in water giving green solutions, and yield upon reduction with stannous chloride and hydrochloric acid a triaminonaphthol sulfonic acid, a diaminodiphenylurea, and a sulfonated or carboxylated aryl monamine of the benzene or naphthalene series. They dye cotton green shades which can be readily discharged by the action of discharging agents such, as for example, sodium hydrosulfite.

The following specific examples will further illustrate the invention, but it is understood that the invention is not limited thereto. The parts are by weight.

*Example 1.*—58.6 parts of the sodium salt of p-aminobenzene-azo-3.6-disulfo-1-amino-8-naphthol-azo-benzene (obtained for instance by coupling one molecular proportion of diazotized para-nitraniline into one molecular proportion of 1.8-aminonaphthol-3.6-disulfonic acid in acid solution and then combining the monazo compound thus prepared with one molecular proportion of diazotized aniline in alkaline solution and reducing the disazo dye thus produced with sodium sulfide) and 27.9 parts of the sodium salt of para-aminobenzene-azo-salicylic acid (prepared for example by combining one molecular proportion of diazotized p-nitraniline with one molecular proportion of salicylic acid in alkaline solution and subsequently reducing the monazo dye thus produced with sodium sulfide) are dissolved in about 900 parts hot water containing about 10 parts of sodium carbonate, and the solution at a temperature of about 50° to 60° C. is treated with phosgene until the formation of the urea is complete. During phosgenation the solution is maintained slightly alkaline by the addition of sodium carbonate at frequent intervals. The phosgenation is complete when a test portion acidulated with hydrochloric acid and treated with a little sodium nitrite gives no blue coloration when spotted on filter paper with a solution of sodium carbonate. When the formation of the urea is complete, the solution is cooled to about 30° C. and the dyestuff salted out by the addition of common salt (about 90 parts), and the dyestuff filtered off, pressed and dried.

The new dyestuff thus obtained, in the form of its sodium salt, most probably corresponds with the following formula:

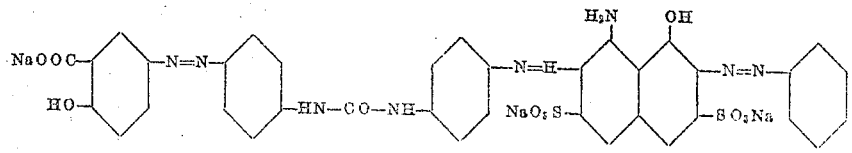

and in the dry and pulverized state is a dark powder soluble in water with a green color, soluble in concentrated sulfuric acid with a brown color which on dilution with ice produces a blue precipitate. Upon reduction with stannous chloride and hydrochloric acid it yields aniline, amino-salicylic acid, 1.2.7 - triamino - 8 - naphthol - 3.6 - disulfonic acid and p.p'-diamino-diphenylurea. From a neutral or alkaline bath, it dyes cotton green tints of excellent fastness to light and washing which can be readily discharged.

*Example 2.*—60.1 parts of the sodium salt of para-aminobenzene-azo-3.6-disulfo-1.8-aminonaphthol-azo-(p)-aminobenzene (obtained for instance by coupling two molecular proportions of diazotized para-nitraniline into one molecular proportion of 1.8-amino-naphthol-3.6-disulfonic acid, the first molecular proportion being coupled in acid solution and the second in alkaline solution, and reducing with sodium sulfide the disazo dye thus produced) and 55.8 parts of the sodium salt of para-amino-benzene-azo-salicylic acid are dissolved in about 1000–1200 parts of water containing about 20 parts of sodium carbonate, and the solution maintained at a temperature of about 50° C. is treated with phosgene until the formation of the urea is complete. During phosgenation the solution is kept alkaline by the addition of sodium carbonate as required. When the formation of the urea is complete, the solution is cooled to about 30°–35° C. and the dyestuff salted by the addition of common salt, and then filtered off, pressed and dried.

The dyestuff thus obtained, in the form of its sodium salt, is probably a composite product the major portion of which corresponds with the following formula

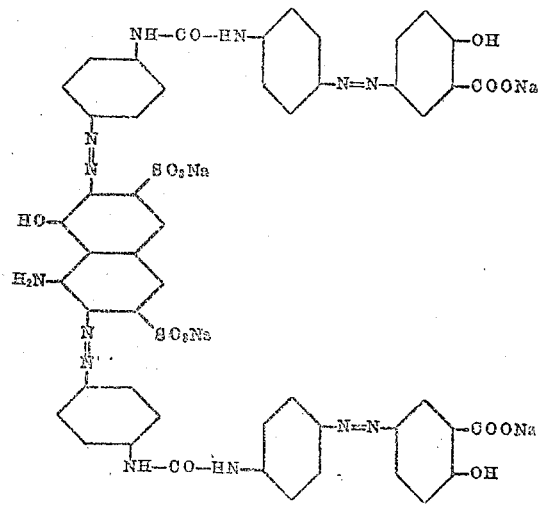

and in the dry and pulverized state is a dark violet powder soluble in water giving a green solution, soluble in concentrated sulfuric acid giving a brown solution which changes to a violet color on dilution with water, and upon reduction with stannous chloride and hydrochloric acid yields 1.2.7-triamino-8-naphthol-3.6-disulfonic acid, p.p'-diaminodiphenylurea, and p-aminosalicylic acid. From a neutral or alkaline bath, it dyes cotton green shades which can be readily discharged.

Instead of employing a disazo compound in which 1.8-amino-naphthol-3.6-disulfonic acid is the middle component as illustrated in the above examples, other disazo compounds containing a 1.8-aminonaphthol mono- or disulfonic acid as middle component may be used such as, for example, those obtainable by coupling on the one hand in acid solution the diazo compound of nitrotoluidine, nitrocresidine, or nitrochloraminoanisol, etc., with 1.8-aminonaphthol-3.6-disulfonic acid or 1.8-aminonaphthol-4.6-disulfonic acid or 1.8-aminonaphthol-4-sulfonic acid, etc., and then combining on the other hand in alkaline solution the monazo dye thus obtained with the diazo compound of aniline or its homologues or substitution products such as, nitraniline, toluidine, chloraniline, sulfanilic acid, anthranilic acid, etc.; and finally reducing the disazo compound thus produced with sodium sulfide. And instead of using the para-aminobenzene-azo-salicylic acid mentioned in the above examples, there may be employed other aminoazo compounds which contain only one free amino group and which may be derived by coupling, for example, a diazo sulfonic or carboxylic acid of the benzene or naphthalene series which may or may not contain substituents into a mono-amine of the benzene series, e. g., aniline, o- and m-toluidine, xylidine, cresidine, anisidine, etc.

I claim:

1. As a new dyestuff, a diphenylurea containing a para-aminobenzene-azo-1.8-aminonaphthol-azo-benzene substance having a sulfonic acid group in the naphthalene nucleus, which dyestuff in the dried and pulverized state, and in the shape of an alkali metal salt, is a dark powder soluble in water, yielding upon reduction with stannous chloride and hydrochloric acid a triamino-8-naphthol sulfonic acid, a diaminodiphenylurea and an aryl monamine derivative, and which dyes cotton green shades which can be readily discharged by the action of discharging agents.

2. As a new dyestuff, the unsymmetrical diphenylurea of para-aminobenzene-azo-salicylic acid on the one hand and p-aminobenzene-azo-3.6-disulfo-1.8-aminonaphthol-azo-benzene on the other hand, which dyestuff constitutes a black powder soluble in water giving a green solution, soluble in concentrated sulfonic acid giving a brown solution, and yielding on reduction with stannous chloride and hydrochloric acid 1.2.7-triamino-8-naphthol-3.6-disulfonic acid, p.p'-diaminodiphenylurea, aniline, and para-aminosalicylic acid, and which dyes cotton green shades which are capable of being discharged.

3. Material dyed with a dyestuff of claim 1.

4. Material dyed with the dyestuff of claim 2.

In testimony whereof I affix my signature.

HENRY WENKER.